(12) United States Patent
Garman et al.

(10) Patent No.: US 8,746,957 B2
(45) Date of Patent: Jun. 10, 2014

(54) STORAGE CASE FOR A HAND MIXER

(75) Inventors: Michael Garman, Midlothian, VA (US); Guoyao Ye, Richmond, VA (US); Michael Allen, Glen Allen, VA (US)

(73) Assignee: Hamilton Beach Brands Inc., Glen Allen, VA (US)

( * ) Notice: Subject to any disclaimer, the term of this patent is extended or adjusted under 35 U.S.C. 154(b) by 876 days.

(21) Appl. No.: 12/683,881

(22) Filed: Jan. 7, 2010

(65) Prior Publication Data

US 2011/0162986 A1   Jul. 7, 2011

(51) Int. Cl.
- B01F 15/00 (2006.01)
- A47J 43/07 (2006.01)
- A47J 47/16 (2006.01)

(52) U.S. Cl.
CPC ............ A47J 43/0711 (2013.01); A47J 47/16 (2013.01); A47J 2043/0738 (2013.01)
USPC ............ 366/129; 220/820; 220/833; 220/839

(58) Field of Classification Search
CPC ... A47J 43/0711; A47J 43/1006; A47J 43/10; A47J 45/02; A47J 47/16; A47J 2043/04418; A47J 2043/0738; B65D 43/16; B65D 85/00
USPC ........... 366/129; 206/320, 723, 724; 220/314, 220/324, 810, 820, 833–837, 839
See application file for complete search history.

(56) References Cited

U.S. PATENT DOCUMENTS

| | | |
|---|---|---|
| D189,680 S | 1/1961 | Chapman |
| 3,170,674 A | 2/1965 | Gomersall |
| 3,357,682 A | 12/1967 | Martens |
| 3,482,893 A | 12/1969 | Butsch |
| 3,680,254 A | 8/1972 | Glass et al. |
| 3,758,183 A | 9/1973 | Steinkamp et al. |
| 3,811,563 A * | 5/1974 | Fox, II ........................ 220/324 |
| D279,856 S | 7/1985 | Elkerbout |
| 4,544,278 A | 10/1985 | Elkerbout et al. |
| 4,645,352 A | 2/1987 | Valbona et al. |
| D345,888 S | 4/1994 | Joss et al. |
| 5,695,087 A * | 12/1997 | Tutton et al. .................. 220/324 |
| D416,168 S | 11/1999 | Huang |
| D419,365 S | 1/2000 | Endres |
| D433,593 S | 11/2000 | Mattijssen |
| D440,814 S | 4/2001 | Thackray |
| D471,758 S | 3/2003 | Wilson |
| D478,467 S | 8/2003 | Holderfield et al. |
| 6,832,543 B2 | 12/2004 | Siano et al. |
| D523,296 S * | 6/2006 | Kim ................................. D7/629 |
| D539,603 S | 4/2007 | Holderfield et al. |
| D540,114 S | 4/2007 | Picozza et al. |
| 2008/0308447 A1* | 12/2008 | Boland ......................... 206/512 |

OTHER PUBLICATIONS

Advertisement for Hamilton Beach "6 Speed Hand Mixer," Model: 62695V, 2004.

* cited by examiner

Primary Examiner — Timothy Cleveland
(74) Attorney, Agent, or Firm — Alexander D. Raring

(57) ABSTRACT

A storage case is removably attachable to a hand mixer for mixing foodstuffs. The storage case includes a bottom wall that extends generally parallel to a bottom surface of the hand mixer when the storage case is attached to the hand mixer. A pair of spaced-apart and generally opposing side walls extend generally perpendicularly from the bottom wall of the storage case. A pair of spaced-apart and generally opposing end walls each extending generally perpendicularly from the bottom wall and the side walls of the storage case. At least a portion of one of the walls of the storage case is pivotally attached by a hinge. The bottom wall, side walls and end walls in combination with the bottom wall generally define a cavity for storing at least one mixing tool therein.

7 Claims, 3 Drawing Sheets

STORAGE CASE FOR A HAND MIXER

BACKGROUND OF THE INVENTION

The present invention relates generally to a storage case for a hand mixer and, more particularly, to a storage case removably attachable to a bottom surface of a hand mixer for storing at least one mixing tool therein, wherein at least a portion of the storage case is openable to provide access to a cavity thereof.

Hand mixers are generally well known in the art. A conventional hand mixer includes a body or casing enclosing a motor. One or more mixing tools, such as beaters or a whisk, may be removably attached to a portion of the hand mixer and operatively connected to the motor. Conventional hand mixers allow a user to quickly and easily stir, mash, beat and/or whisk a variety of foodstuffs in a container without exerting a substantial amount of energy by the user. Conventional hand mixers also include a plurality of separable and/or independent parts or components. Thus, a user may misplace or lose one or more of the components, such as the various mixing tools.

Therefore, it would be desirable to provide a hand mixer with a generally hollow space or cavity to store various components thereof when the hand mixer is not in use. Specifically, it would be desirable to provide a storage case that is removably attachable to a hand mixer such that one or more components of the hand mixer may be stored within the storage case. Furthermore, it would be desirable to provide selective access to an interior area or cavity of the storage case while the storage case is attached to the hand mixer.

BRIEF SUMMARY OF THE INVENTION

Briefly stated, the present invention is directed to a storage case that is removably attachable to a hand mixer for mixing foodstuffs. The storage case includes a bottom wall that extends generally parallel to a bottom surface of the hand mixer when the storage case is attached to the hand mixer. A pair of spaced-apart and generally opposing side walls extend generally perpendicularly from the bottom wall of the storage case. A pair of spaced-apart and generally opposing end walls extend generally perpendicularly from the bottom wall and the side walls of the storage case. At least a portion of one of the walls of the storage case is pivotally attached by a hinge. The bottom wall, side walls and end walls in combination with the bottom wall generally define a cavity for storing at least one mixing tool therein.

In another aspect, the present invention is directed to a combination hand mixer and storage case. The hand mixer encloses a motor and has a handle, a plurality of side walls and a bottom surface. At least one mixing tool is removably attachable to the bottom surface of the hand mixer and is operatively connectable to the motor of the hand mixer for mixing foodstuffs. The storage case includes a bottom wall, a pair of spaced-apart and opposing side walls and a pair of spaced-apart and opposing end walls. The side walls and end walls define a continuous free edge of the storage case opposing the bottom wall. One of the walls of the storage case defines a door therein. A hinge pivotally attaches the door. The free edge of the storage case is removably mountable around an outer periphery of the bottom surface of the hand mixer to define a cavity for storing the at least one mixing tool therein. The door provides access to the cavity.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
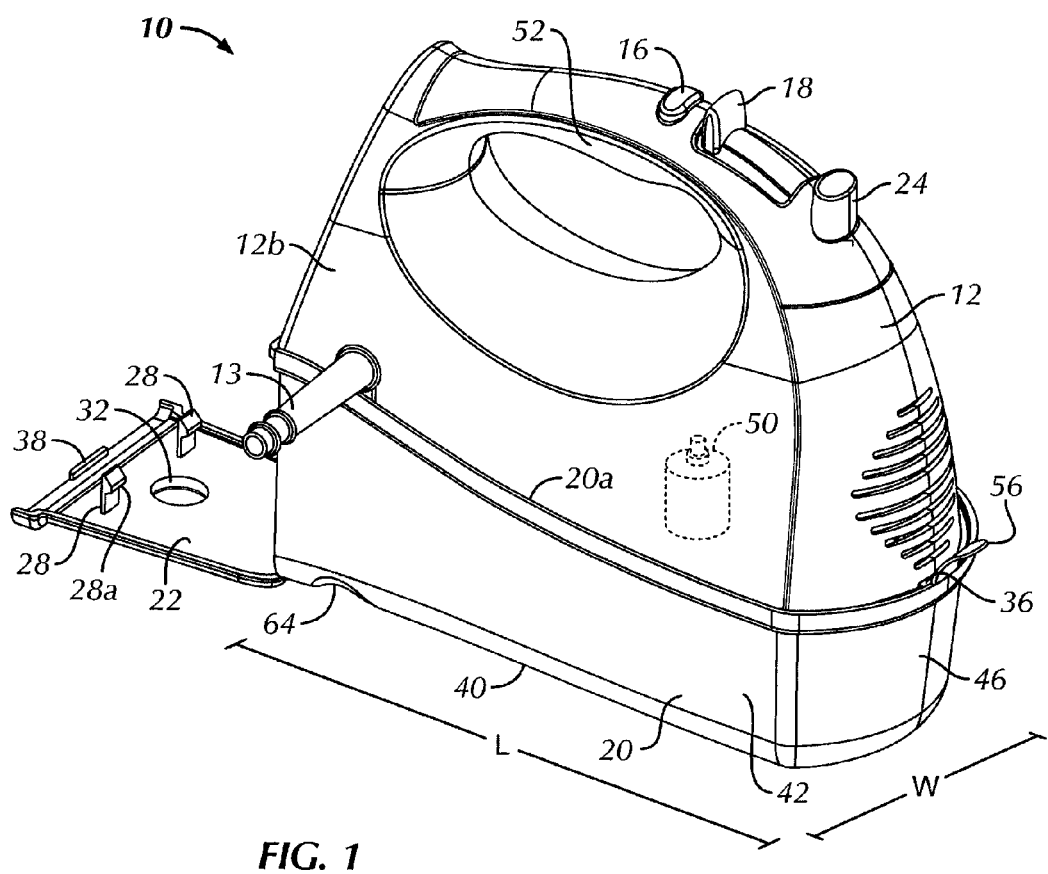
FIG. 1 is right side front perspective view of a combination hand mixer and storage case in accordance with a preferred embodiment of the present invention, wherein a portion of the storage case is shown in an open position.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the hand mixer and/or storage case in accordance with the present invention, and designated parts thereof. Unless specifically set forth herein, the terms "a", "an" and "the" are not limited to one element but instead should be read as meaning "at least one." The terminology includes the words noted above, derivatives thereof and words of similar import.

Figure 2:
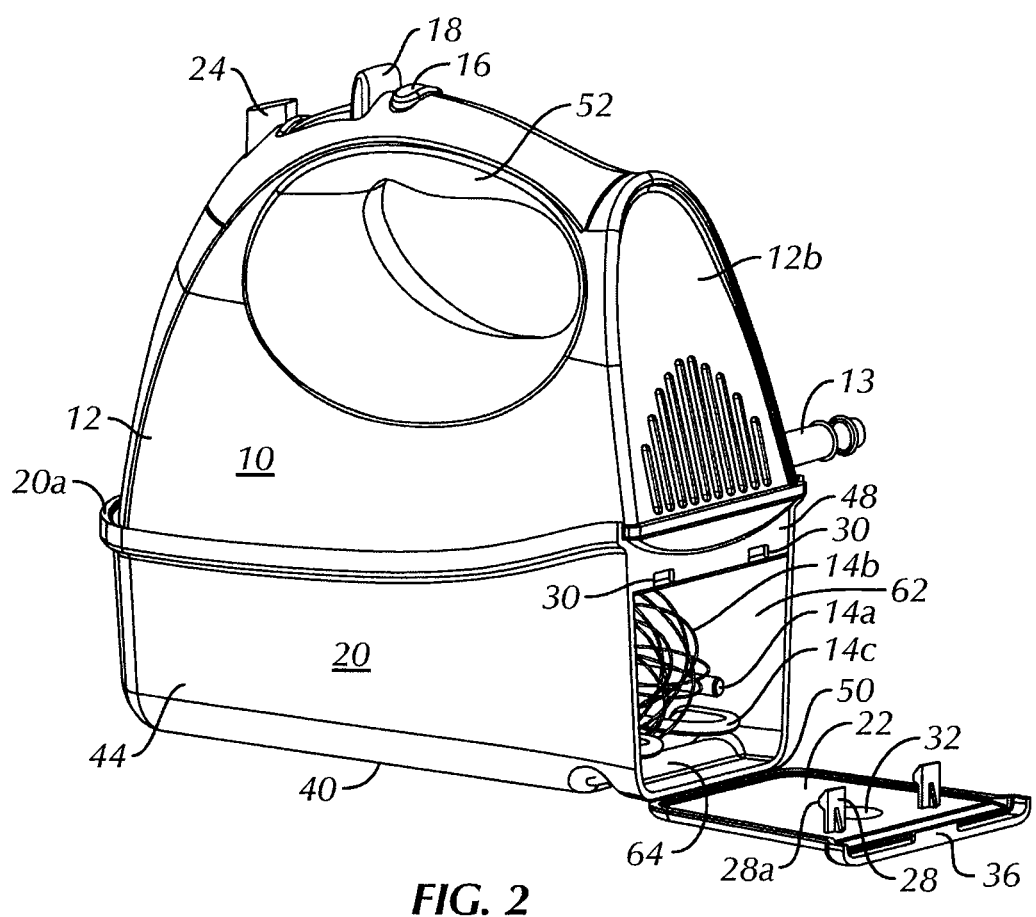
FIG. 2 is left side rear perspective view of the combination hand mixer and storage case shown in FIG. 1, with the portion of the storage case shown in the open position.
Figure 3:
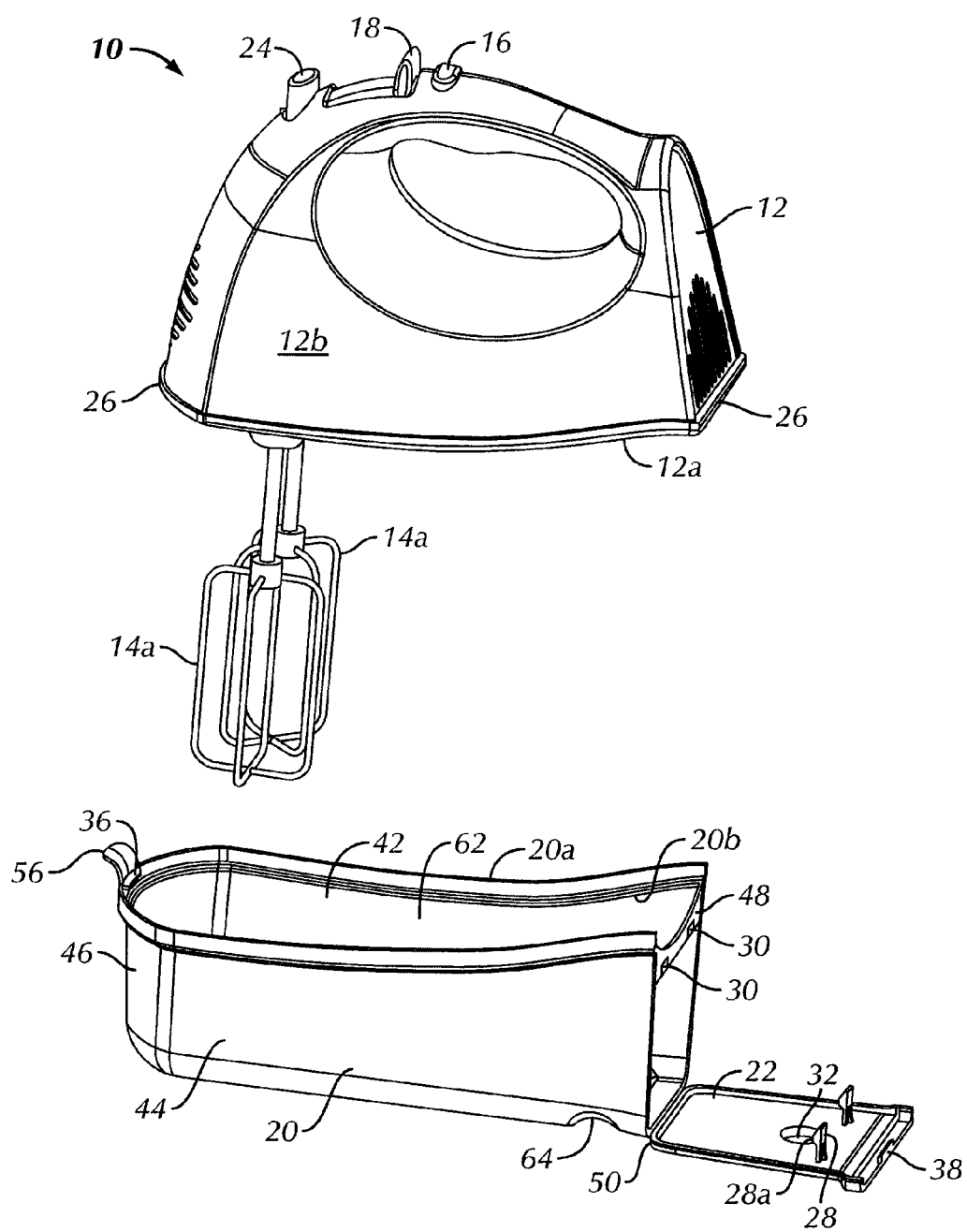
FIG. 3 is an exploded left side perspective view of the combination hand mixer and storage case shown in FIG. 1, with a pair of mixing tools shown operatively attached to the hand mixer and the portion of the storage case shown in the open position.

Referring to the drawings in detail, wherein like numerals indicate like elements throughout, there is shown in FIGS. 1-3 a combination hand mixer 10 and storage case 20, wherein the storage case 20 is preferably removably attachable to the hand mixer 10. Although reference is made herein to the relatively small, light weight and portable hand mixer 10 for mixing foodstuffs, it is understood by those skilled in the art that the storage case 20 may be attachable to virtually any kitchen appliance that would benefit from the features of the storage case 20 described herein.

Referring to FIGS. 1-3, the hand mixer 10 preferably includes a body 12, which encloses a motor 50 (FIG. 1), a handle 52 and a cord bushing 13 extending outwardly from a side wall 12b of the body 12. As understood by those skilled in the art, an electrical power cord (not shown) preferably extends outwardly from the cord bushing 13. The power cord may be removably attached to the hand mixer 10. A first end of the power cord preferably includes a male-type electrical connector (not shown) that is operatively connectable to a conventional power outlet (not shown). An opposite second end (not shown) of the power cord extends within the interior of the body 12 and is operatively connected to the motor 50.

As seen in FIGS. 2 and 3, one or more mixing tools 14, such as one or a pair of wire beaters 14a, one or a pair of whisks 14b, and/or one or a pair of dough hooks 14c are selectively removably attachable in a manner well known in the art to suitable standard connectors (not shown) or the like of a type well known in the art on a preferably generally planar bottom surface 12a of the mixer body 12. Preferably, the side walls 12b of the body 12 extend generally perpendicularly from the bottom surface 12a. Further, the hand mixer 10 preferably includes a ledge or mold line 26 that extends generally perpendicularly from the side walls 12b proximate the bottom surface 12a around an entire perimeter of the hand mixer 10. When operatively attached to the hand mixer 10, the one or more mixing tools 14 are operatively connected to the motor 50 and allow a user to selectively mix foodstuff within a bowl or other similar container (not shown). The body 12 preferably includes a burst button 16, a motor speed control knob 18 and an eject button 24 to allow the user to easily manipulate and/or remove the mixing tools 14 from the bottom surface 12a. For the sake of brevity and since those of ordinary skill in the art understand how the hand mixer 10 operates, a detailed description of the operation of the hand mixer 10 is omitted herein.

As seen in FIGS. 1-3, the storage case 20 may be generally opaque so that any objects or components removably stored therein are generally hidden or not visible from the external environment when the hand mixer 10 is positioned on the storage case 20. Alternatively, the storage case 20 may be generally transparent or translucent, such that the objects removably stored therein may be identified relatively easily and quickly from the external environment when the hand mixer 10 is positioned on the storage case 20. In the preferred embodiment, the storage case 20 is generally rectangular in shape (when viewed from above or below) and generally conforms to the shape of the bottom surface 12a of the mixer 10 or at least the ledge 26. Preferably, the storage case 20 is formed of a light weight, high strength material, such as a polymeric or metallic material, such as steel, aluminum or alloys thereof. However, storage case 20 may be formed of virtually any material and may have any shape suitable for performing the functions described herein.

Referring again to FIGS. 1-3, the storage case 20 preferably includes a generally flat or planer bottom wall 40 that defines a plane that extends generally parallel to the bottom surface 12a of the hand mixer 10 when the storage case 20 is attached to the hand mixer 10 (FIGS. 1 and 2). A pair of spaced-apart and opposing generally flat or planer side walls 42, 44 each define a plane that extends generally perpendicularly to that of the bottom wall 40. The bottom wall 40 and side walls 42, 44 preferably have a generally equal length "L" (FIG. 1). Further, the storage case 20 preferably includes a pair of spaced-apart and generally opposing end walls 46, 48. It is preferred that each end wall 46, 48 defines a plane that extends generally perpendicularly to that of bottom wall 40 and to the side walls 42, 44.

In the preferred embodiment, the end wall 46 proximate a front of the hand mixer 10 when the storage case 20 is attached to the hand mixer 10 is generally at least slightly arcuate, while the end wall 48 proximate a rear of the hand mixer 10 when the storage case 20 is attached to the hand mixer 10 is generally flat or planar. A width "W" (FIG. 1) of each end of the walls 46, 48, which are generally equal, is generally less than half the length "L" of the bottom wall 40 and side walls 42, 44. Thus, in the preferred embodiment, the length "L" of the storage case 20 is preferably at least twice the width "W."

In the preferred embodiment, an intersection line of each of the ends walls 46, 48, side walls 42, 44 and the bottom wall 40 may be in the form of a generally curved or arcuate corner. Interior surfaces of the walls 40, 42, 44, 46, 48 in combination with the bottom surface 12a of the hand mixer 10 (when the storage case 20 is attached to the hand mixer 10) generally define a cavity 62 of the storage case 62 that is sized and shaped to receive one or more objects or components therein, such as the mixing tools 14 and/or the power cord (not shown). At least a portion of the bottom wall 40 may include an interiorly extending arcuate ridge 64. A longitudinal axis of the ridge 64 preferably extends generally parallel to the planes defined by the end walls 46, 48. The ridge 64, which is preferably located proximate the rear of the hand mixer 10 when the storage case 20 is attached to the hand mixer 10, helps to prevent one or more of the mixing tools 14 from inadvertently sliding out of the storage case 20.

As seen in FIG. 3, the storage case 20 preferably includes a generally open top surface when the storage case 20 is not attached to the hand mixer 10. Specifically, the side walls 42, 44 and the end walls 46, 48 preferably define a generally continuous, free, top edge 20a of the storage case 20. The top edge 20a generally opposes the bottom wall 40 of the storage case 20 and is spaced a predetermined distance above the bottom wall 40. The size and shape of an entire contour of the top edge 20a generally matches that of the bottom surface 12a of the hand mixer 10. Specifically, the top edge 20a of the storage case 20 has a generally contoured or curved-linear shape that generally conforms to the bottom surface 12a of the hand mixer 10 so that the top edge 20a engages the periphery of the bottom surface 12a of the hand mixer 10 with an interference fit.

In the preferred embodiment and as described in detail below, the top edge 20a of the storage case 20 is generally sized and shaped such that it is removably mountable around an outer periphery of the bottom surface 12a of the hand mixer 10. Specifically, as seen in FIG. 3, an interior shelf 20b is spaced a predetermined distance below the top edge 20a. It is preferred that the shape of an entire contour of the shelf 20b generally matches that of the top edge 20a, such that the contour of the shelf 20b is curved-linear in shape. The shelf 20b preferably extends generally perpendicularly from an interior surface of the side walls 42, 44 and the end walls 46, 48 of the storage case 20 for receiving a peripheral portion of the bottom surface 12a of the hand mixer 10.

Referring again to FIGS. 1-3, in the preferred embodiment at least a portion of one of the walls 40, 42, 44, 46, 48 of the storage case 20 is pivotally attached to one of the remaining walls 40, 42, 44, 46, 48 of the storage case 20. More specifically, one of the walls 40, 42, 44, 46, 48 of the storage case 20 defines a generally flat or planar door 22 therein. In the preferred embodiment, the door 22 is formed of a portion of the end wall 48 that is proximate a rear of the hand mixer 10 when the storage case 20 is attached to the hand mixer 10. Further, the door 22 is preferably pivotally attached to one of the walls 40, 42, 44, 46, 48, in the present embodiment the bottom wall 40, at an outer edge thereof by a hinge 50. The hinge 50 is preferably a living hinge, but may be any one of a variety of types of hinges, such as one or more barrel hinges, pivot hinges, mortise hinges or continuous/piano hinges, for example.

A longitudinal axis of the living hinge 50 preferably extends generally parallel to the plane defined by the end wall 48 that is proximate the rear of the hand mixer 10 when the storage case 20 is attached to the hand mixer 10. In operation, the door 22 is pivotable about the living hinge 50 from a closed position (not shown) to enclose the cavity 62 to a generally open position (FIGS. 1-3) generally providing access to the cavity 62 through a portion of the rear end wall 48. The inclusion of the door 22 provides a user with a way to insert and/or remove contents into/from the cavity 62 of the storage case 20 without having to remove the storage case 20 from the hand mixer 10.

As seen in FIGS. 1-3, in the preferred embodiment the storage case 20 includes at least one and preferably two spaced-apart latching hooks 28 that extend generally perpendicularly from an interior surface of the door 22. An end of each latching hook 28 distal from the interior surface of the door 22 includes an enlarged rib 28a. Further, as seen in FIGS.

2 and 3, the storage case 20 includes at least one and preferably two spaced-apart openings 30 at the top of the end wall 48 of the storage case 20 proximate the rear of the hand mixer 10 when the storage case 20 is attached to the hand mixer 10. Each latching hook 28 preferably corresponds to one of the openings 30, such that at least one of the latching hooks 28 is sized and shaped to engage at least a portion of one of the openings 30 when the door 22 is in the closed position. Specifically, each rib 28a is sized and shaped such that an additional amount of force is required, as compared to simply pivoting the door 22, to insert or remove each latching hook 28 from the corresponding opening 30.

As seen in FIGS. 1-3, it is preferred that the door 22 includes at least one finger opening 32 therein to facilitate grasping the door 22 by the user. Specifically, the opening 32 is preferably circular and generally centrally horizontally located within the door 22. Further, the opening 32 is sized and shaped such that a finger of the user, for example, can be at least partially inserted therein. Once at least a portion of the finger extends to and engages the interior surface of the door 22, a user may relatively easily pivot the door 22 about the living hinge 50 by pulling at least an upper portion of the door 22 away from the end wall 48.

Referring to FIGS. 1 and 3, the storage case 20 preferably includes at least one first or front tab 36 that extends generally perpendicularly inwardly from an interior surface of the end wall 46 of the storage 20 proximate a front of the hand mixer 10 when the storage case 20 is attached to the hand mixer 10. The front tab 36 is preferably located proximate the top edge 20a of the storage case 20 and, more particularly, is located above the shelf 20b.

Referring to FIGS. 2 and 3, the storage case 20 preferably includes at least one second or rear tab 38 that extends generally perpendicularly inwardly from an interior surface of the door 22. The rear tab 38 is preferably located proximate a free or top edge of the door 22 and is located above the shelf 20b when the door 22 is in the closed position. As seen in FIGS. 2 and 3, the rear tab 38 is preferably generally at the opposite end of the storage case 20 from the front tab 36.

Referring again to FIGS. 1-3, the storage case 20 preferably includes at least one pull tab 56 that extends generally upwardly from the top edge 20a of the storage case 20. The pull tab 56 is preferably generally arcuate in shape and extends away from an exterior surface of the end wall 46 of the storage 20 proximate a front of the hand mixer 10 when the storage case 20 is attached to the hand mixer 10. The pull tab 56, which is preferably vertically above the front tab 36, generally assists a user in removing the storage case 20 from the hand mixer 10.

In operation, to fixedly attach the storage case 20 to the hand mixer 10 and store at least one object in the cavity 62, the user must remove the at least one mixing tool 14 from the bottom surface 12a of the hand mixer 10. The user may place the hand mixer 10 on top of the storage case 20, or vice versa, such that at least a front portion of the ledge 26 is located between the front tab 36 and the shelf 20b. To lock the storage case 20 to the hand mixer 10, the user must pivot the door 22 from the open position (FIGS. 1-3) to the closed position such that a rear portion of the ledge 26 is located between the rear tab 38 and the shelf 20b. In this position, since the front and rear tabs 36, 38 hold or sandwich at least a portion of the ledge 26 of the hand mixer 20 above the shelf 20b, the storage case 20 is retained on the bottom of the hand mixer 10.

It is understood, however, that the hand mixer 10 and storage case 20 are not limited to the inclusion of the ledge 26, front and rear tabs 36, 38 and shelf 20b to create a removable attachment. Instead, the storage case 20 may be removably attached to the hand mixer 10 by any one of a variety of connections, such as pin and slot, screw and/or magnetic. The object(s) removably stored within the storage case 20 may be accessed either after the hand mixer 10 has been released from the storage case 20 or by pivoting the door 22 to the open position (FIGS. 1-3).

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A storage case removably attachable to a hand mixer for mixing foodstuffs, the storage case comprising:
    a bottom wall extending generally parallel to a bottom surface of the hand mixer when the storage case is attached to the hand mixer;
    a pair of spaced-apart and generally opposing side walls, each sidewall extending generally perpendicularly from the bottom wall; and
    a pair of spaced-apart and generally opposing end walls, each end wall extending generally perpendicularly from the bottom wall and the side walls,
    the bottom wall, side walls and end walls in combination with the bottom surface of the hand mixer generally defining a cavity for storing at least one mixing tool therein, a continuous free edge defined by the side walls and end walls, the free edge having a generally contoured shape that generally conforms to the bottom surface of the hand mixer,
    the end wall that is proximate a rear of the hand mixer when the storage case is attached to the hand mixer includes a door therein, wherein the door is pivotable about a living hinge from a closed position to enclose the cavity to an open position generally providing access to the cavity,
    at least one latching hook extending generally perpendicularly from an interior surface of the door, a distal end of each latching hook extending from the interior surface of the door including an enlarged rib; and
    at least one opening in the end wall proximate the rear of the hand mixer when the storage case is attached to the hand mixer,
    wherein the at least one latching hook is sized and shaped to engage the at least one opening when the door is in the closed position, and
    at least one pull tab extending upwardly from the free edge of the storage case.

2. The storage case according to claim 1, wherein the at least one latching hook comprises two spaced-apart latching hooks and the at least one opening comprises two spaced-apart openings, wherein each latching hook corresponds to one of the openings.

3. The storage case according to claim 1, wherein the door includes an opening therein to facilitate grasping the door by a user.

4. The storage case according to claim 1, wherein the at least one pull tab comprises
    a shelf spaced a predetermined distance below the free edge, a contour of the shelf generally matching the contour of the free edge, wherein the shelf extends generally perpendicularly inwardly from an interior surface of the side walls and end walls for receiving a peripheral portion of the bottom surface of the hand mixer.

5. The storage case according to claim 4, further comprising:
   at least one front tab extending generally perpendicularly from an interior surface of the end wall of the storage case proximate a front of the hand mixer when the storage case is attached to the hand mixer, the least one front tab being located proximate the free edge of the storage case.

6. The storage case according to claim 5, further comprising:
   at least one rear tab extending generally perpendicularly from an interior surface of the door, the least one rear tab being located proximate a free edge of the door.

7. The storage case according to claim 1, further comprising:
   the least one pull tab being generally arcuate in shape.

* * * * *